UNITED STATES PATENT OFFICE.

PETER CAMERON DOUGLAS CASTLE, OF LIVERPOOL, ENGLAND.

PROCESS OF EXTRACTING GUM FROM PLANTS.

SPECIFICATION forming part of Letters Patent No. 566,497, dated August 25, 1896.

Application filed April 19, 1895. Serial No. 546,403. (No specimens.)

*To all whom it may concern:*

Be it known that I, PETER CAMERON DOUGLAS CASTLE, a subject of the Queen of Great Britain, residing at Liverpool, in the county of Lancaster, Kingdom of England, have invented certain new and useful Improvements in the Manufacture of Gum or Gummy Compounds, of which the following is a specification.

In the specification of Patent No. 531,377, dated December 25, 1894, there is given a method of manufacturing gum known as "gum tragasol" from the kernels of the locust-tree. Since then I have greatly improved the process, and have therefore made a more lasting and otherwise valuable gum. I have found that if the kernels be boiled the gum is very greatly deteriorated, and if the shells be present when boiled coloring-matter is extracted therefrom, which spoils the gum, while if heated much below 71° centigrade the gum is not dissolved out of the beans to any appreciable extent, and that it is only by keeping the temperature between 71° to 82° centigrade that the best results are obtainable.

Now my present invention is designed to produce a material mainly from these ceratonia kernels, which can be kept for a long period without undergoing decomposition.

I have two processes, in many respects closely resembling each other, for the production of gum from these kernels, the said kernels being in each case washed quite free from the least vestiges of the saccharine matter adhering to them. The kernels are in each case split and the cotyledons separated from the central germ. The two processes differ from each other in that in one process I do not remove the cuticle or husk, which is a rather difficult and expensive operation, and in the other I do remove them before commencing the extraction of the gum therefrom.

First process: To one hundred pounds of the kernels I add two hundred gallons of boiling water, stirring the whole up in a steam-jacketed vat lined with lead, aluminium, or silver, the stirring machinery being also preferably of or coated with aluminium or hard wood. After two or three minutes stirring the whole is allowed to stand over about half an hour or a little longer, according to the quality, age, and freshness of the kernels. It is then again stirred for a few minutes, and this stirring is repeated at intervals till two and one-half to three hours have elapsed. In the meantime the temperature is kept up to from 71° to 82° centigrade. The time varies with different qualities of kernel and the exact period for giving the best results can only be found in each case by practice. The mass is now run into a chamber below the vat supplied with powerful aluminium or hard-wood beaters, where it is violently agitated, and from there run gradually into a centrifugal hydro-extractor driven at high velocity and the cage of which is lined with aluminium-wire gauze and fine silk. Gum of the consistency of thick cream is thus separated from the remaining portion of the kernels and is run into another vat containing wooden beaters. The kernels are again placed in the same or another vat to that already described. Another one hundred to one hundred and fifty gallons of hot water is again applied, preferably about one hundred first, the remaining water being added from time to time. It is then treated as before, with occasional stirring for three or four hours, the temperature being kept, as before, to from 71° to 82° centigrade. It is then centrifugaled and the resulting gum kept separate or added to the preceding gum extracted. To the gum thus obtained carbolic acid is added in the proportion of one part to one thousand parts of gum. Other antiseptics can, however, be used in equivalent quantities instead of carbolic acid. The gum with the acid is now agitated by wooden beaters until the acid is thoroughly incorporated with the gum. It is now run through fine silks in order to extract any specks of the cuticle which the hydro-extractor has failed to retain. It is then right for the final operation in this process, namely: It is passed into a steam-jacketed mixer lined with tin, lead, aluminium, or silver, and supplied with mixers formed of solid aluminium. To the weight of gum is now added five per cent. of the finest quality of farina, preferably that made from wheat. This farina has been previously mixed with a small quantity of the gum, so as to bring it to the consistency of thick cream. The whole is now kept continuously stirred and at the same time heated up to but not exceeding 82° centigrade, this continuing for twenty to twenty-five minutes, and while still at that temperature or even a little less I add best commercial hydrochloric acid to the extent of one or rather more to one thousand parts of the gum, and continue the rapid stirring till the whole mass is of as uniform a consistency as the original gum. The hydrochloric acid combines and diffuses the farina intimately throughout the gum, making the resulting substance one homogeneous mass, retaining a perfectly equal consistency without the aid and expense of roller-mills, silks, or other apparatus used in the reduction and smoothing of sizes. During this process a considerable part of the hydrochloric acid will have evaporated, and if the fumes be objectionable they can be drawn off and condensed or fixed by means of lime, water or otherwise. The mass while still hot is now run out of the mixer into casks set below it, and sets in this into a firm paste which contains about ninety-five per cent. of aqueous solution of the gum and five per cent. of farina. This material I have found to keep for a very long time without producing mold or any fungoid growth or decomposing. It is chiefly used for heavy sizing of cotton and woolen yarns and other textile fabrics. For some purposes, however, I prefer ten or even twelve per cent. of farina instead of five per cent., especially where heavy loading of textile fabrics is required. Where various substances, such as soapstone or steatite, sulfate of lime or magnesia are employed as loading, it is desirable to thoroughly boil and fix up the loading with the gum and farina. This mixture of gum and farina will take the place of tallow to a very great extent in sizing cloth, and in this respect is at least equal to if not superior to gum tragacanth, for which it can be substituted for almost all purposes.

Second process: In this process the kernels are separated in decorticating machines, specially designed, the husk from the cotyledons and the germs and husk carefully winnowed from the cotyledons. One hundred pounds of the cleaned cotyledons and two hundred gallons of boiling water are placed in the vat with stirrers and stirred at intervals of half an hour for two hours, the whole being kept at a temperature of about 82° centigrade. Sixty-five to seventy gallons of boiling water are then added and the stirring continued intermittently every quarter of an hour for three and one-half hours or thereabout, when the whole material will be found to be one homogeneous mass. During the whole of this operation the vat remains covered. During the final two and one-half hours it is left open for evaporation. During the whole operation, however, the temperature is preferably kept at as near as possible 82° centigrade. The mass is now submitted to violent agitation by means of beaters in another vat, and is then passed to a filter-press lined with lead, tin, aluminium, or silver. This is perforated all around and covered with fine aluminium-wire gauze, through which the gum passes and is then passed into a tank. Any other form of filter-press, however, which will allow the liquid to pass while retaining the solid matter can be used. The solid matter has still a considerable amount of gum, and can be subjected to a second treatment similar to the above. The gum thus extracted from the original cotyledon sets into a firm, bright yellow jelly not unlike fine gum-arabic solution. It can be used for size, as in the first process, but is of great value in culinary purposes, confectionery, compounding of boluses, and other medicinal and many other purposes. When it is used for sizing, it is run into a wooden mixing-vat, where it is mixed with carbolic acid in the same manner as described in the first process. It is then filled into the casks or other vessels and is ready for use. The partially-solid mass from the filter-press is again treated with one hundred gallons of boiling water and treated substantially as before. The gum from this second treatment is also a beautifully clear gelatinous gum, and is of special value for sizing, dressing, and finishing the finest cotton fabrics, and also for linen and silk. It is also superior to any substance known to me for thickening colors for calico and other printing. When necessary, it can also be treated with carbolic acid or other antiseptic, as already described. I have also found that by taking either of these clear solutions of gum and placing it in a mixer and adding a further quantity of carbolic acid, preferably what is known in England as "Calvert's No. 5," say one part, or rather more, to one thousand of gum, and violently agitating the same with the aluminium stirrers the gum is formed into a milky white emulsion, which is softer and more slippery than the original gum and which is valuable as a substitute for tallow in sizing or other kindred operations. Any or all of these products, when desirable, can be solidified by careful evaporation. The solid refuse is found useful for feeding purposes. The gum, with or without loading, is also found very valuable by paper-makers.

I declare that what I claim is—

1. The process of obtaining a manufacturer's gum from the seeds of the locust-tree (*Ceratonia siliqua*) which embraces the following steps: separating the cotyledons from the husks and germs; soaking the cotyledons in water between 71° and 82° centigrade but not allowing the same to boil; stirring the ingredients from time to time; and finally separating the liquid from the solid ingredients.

2. The process of obtaining gum from the seeds of the locust-tree (*Ceratonia siliqua*) which consists in separating the kernels from the husks and germs; steeping the kernels in water maintained at a temperature not exceeding 82° centigrade, with occasional agitation, as described; separating the gum from the solid matter, and finally adding farina, substantially as described.

3. The process of obtaining gum from the seeds of the locust-tree (*Ceratonia siliqua*) which consists of the following steps; separating the kernels from the husks and germs; steeping the kernels in water maintained at a temperature not exceeding 82° centigrade, with occasional agitation as described; separating the gum from the solid matter; and adding farina and hydrochloric acid, substantially as described.

4. The improvement in the process of obtaining gum from the seeds of the locust-tree (*Ceratonia siliqua*) which consists of the following steps; separating the husks and germs from the kernels; steeping the kernels in water maintained at a temperature not exceeding 82° centigrade with occasional agitation as described; separating the gum from the solid matter; adding farina and hydrochloric acid; and finally incorporating therewith mineral loading material.

In testimony whereof I have signed my name to this specification in the presence of two subscribing witnesses.

PETER CAMERON DOUGLAS CASTLE.

Witnesses:
W. H. BEESTON,
THOS. P. BIRD.